Nov. 8, 1927.

J. V. GIESLER

PACKLESS VALVE

Filed July 20, 1923    2 Sheets-Sheet 2

Inventor
Jean V. Giesler
By Mauro, Cameron, Lewis & Harkaur
Attorneys

Patented Nov. 8, 1927.

1,648,884

UNITED STATES PATENT OFFICE.

JEAN V. GIESLER, OF KNOXVILLE, TENNESSEE, ASSIGNOR, BY MESNE ASSIGNMENTS, TO THE FULTON SYLPHON COMPANY, OF KNOXVILLE, TENNESSEE, A CORPORATION OF DELAWARE.

PACKLESS VALVE.

Application filed July 20, 1923. Serial No. 652,833.

This invention relates to packless valves and, while capable of embodiment in packless valves of a variety of types, possesses particular utility when embodied in packless valves of the type wherein the opening and closing of the valve is accomplished by a single rotation, or a part of a rotation, of operating mechanism using a single highpitch thread, or multiple threads of lower pitch, for converting the rotary movement of the valve operating member into a rectilinear movement of the valve member.

It has heretofore been proposed to provide a packless valve, including a flexible wall constituting a fluid-tight connection intermediate the valve member and its casing, with valve operating means and means cooperating therewith for indicating the position of the valve member. Structures of this type have been proposed, however, which possess the disadvantage that the valve member cannot be removed from its casing for the replacement of the valve disc without disassembling the valve member, flexible wall and valve operating and indicating means to a greater or less extent, and as valve discs have to be renewed frequently and as this work is frequently done by plumbers unskilled in the adjustment of valves of this character, it is of importance that the valve member, together with its flexible wall and its operating and indicating means, be removable from its casing as a unit, so as not to disturb the relation of said flexible wall to said valve member and operating means and so as not to disturb the relation of said indicating means with respect to the valve member.

It is an object of this invention to provide an improved packless valve whereby the valve member, flexible wall and valve operating and indicating means may be readily applied to and withdrawn from the valve casing as a simple, readily manipulated unit without disturbing the relation of said parts.

It has also been proposed to provide a packless valve employing a flexible wall as a fluid-tight connection intermediate the valve member and its casing wherein said flexible wall is brazed or soldered to the valve member and the casing cap. While enabling the flexible wall to be removed from the casing as a unit with the cap and valve member, structures of this character possess numerous disadvantages among which may be particularly noted the fact that in case of injury to the flexible wall a new flexible wall can be supplied only by also providing a new casing cap, valve member and associated parts.

It is an object of this invention to provide a packless valve wherein the flexible wall is retained in unitary relation with the valve member and casing cap and yet wherein the parts are separably connected so that a new flexible wall may be supplied without the necessity of also supplying a new casing cap and associated parts.

It has also been proposed to provide a valve member and valve operating means in unitary relation with a casing cap so that said parts may be applied to and withdrawn from the valve casing as a unit and, in some instances, it has been proposed to employ as a part of this unit a flanged valve stem together with a spring for holding the flange on said stem in contact with said cap, so as to permit relative rotation, but prevent relative axial displacement, of said parts. Structures of this type so far as I am aware have always employed packing between the valve stem and the casing and are not adapted to use a flexible wall to form a fluid-tight connection intermediate the valve member and valve casing for a variety of reasons, among which may be particularly noted the fact that if a flexible wall were used in place of packing the torque exerted on said wall when assembling the parts would be likely to result in an early rupture of said wall.

It is an object of this invention to provide a packless valve wherein the casing cap, flexible wall, valve member and operating means are connected into a readily attachable and detachable unit which may be readily applied to and withdrawn from the valve casing without danger of exerting any disruptive force on the flexible wall and which may also employ a flanged valve stem with the flange thereof held in rotatable but non-displaceable relation with respect to the cap by the action of resilient means.

Other objects of this invention relate to the provision, in a valve of the type heretofore referred to, of improved means for preventing axial displacement or lost motion of the valve stem; improved means for uniting the casing cap, flexible wall, valve member and associated parts so that they are disconnectible but not relatively rotatable; improved means for connecting the valve operating member to the valve stem so as to permit nice adjustment between the two; improved means for mounting a dial plate on the casing cap so as to permit nice adjustment of the same and yet positively prevent rotatable displacement of said dial plate under the action of the valve operating means; and an improved valve member having an integral threaded stem constituting a part of the operating means of said valve member, an integral flange for the connection of the flexible wall thereto and also, if desired, an integral threaded stem for securing the valve disc to said member.

Another object of this invention is to provide a packless valve which is composed of a relatively few simple parts that may be inexpensively manufactured and which may be easily and quickly assembled, installed and adjusted. Other objects of this invention will appear hereinafter.

The invention is capable of receiving a variety of mechanical expressions, two of which are shown on the accompanying drawings, but it is to be expressly understood that the drawings are for purposes of illustration only and are not to be construed as a definition of the limits of the invention, reference being had to the appended claims for that purpose.

Referring in detail to said drawings, wherein the same reference characters are employed to designate corresponding parts in the several figures:—

In the form shown in Figs. 1 to 4, 10 is a valve casing of any suitable type, form, size and material, being shown as of a type commonly employed on radiators, and provided with a threaded opening 11 and a threaded nipple 12 to which a suitable tail piece 13 is secured by a union nut 14. Interiorly said casing is provided in any suitable way with a valve seat 15 of any suitable form.

Figure 1:
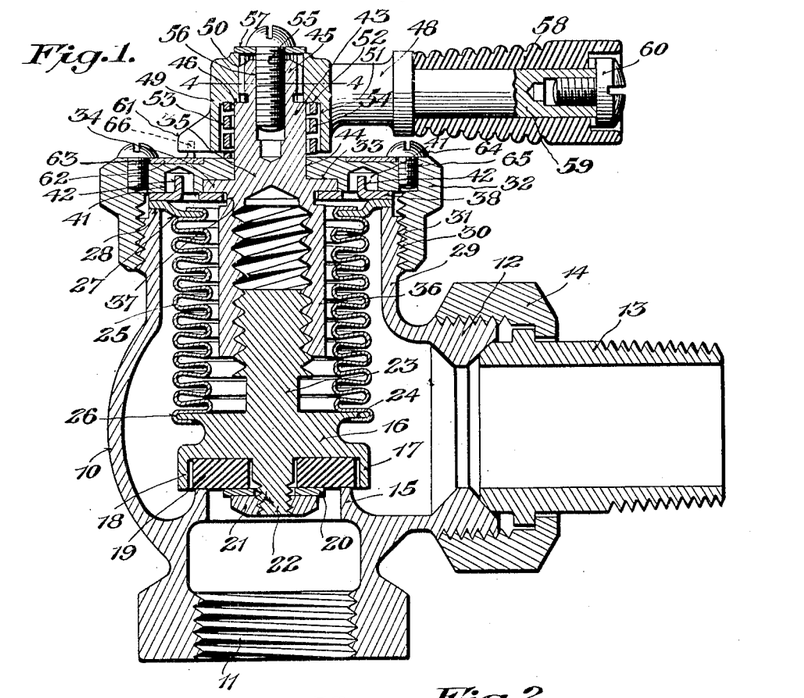
Fig. 1 is an axial section on an enlarged scale of a valve embodying the present invention;—

Cooperating with said valve seat 15 is a valve member 16 of any suitable form and construction, shown as having a peripheral flange 17 providing a recess or housing 18 in which a valve disc 19, of any suitable form and material, may be retained in any suitable way, as by a washer 20 and nut 21 cooperating with a threaded stem 22 projecting from the underside of said valve member 16. Projecting from the opposite or upper face of said valve member 16 is a second threaded stem 23, and said valve member is also preferably provided with a flange 24 for the attachment thereto of the flexible wall to be described. In the preferred embodiment of this invention, the flange 24, the threaded stem 23 and the threaded stem 22 are formed integrally with said valve member 16.

Extending as a fluid tight partition and connection intermediate said valve member 16 and the valve casing 10 is a flexible wall 25 of any suitable construction and material, but preferably in the form of a flexible, corrugated, expansible and collapsible tubular wall of resilient metal, such as brass or copper. This flexible wall may be connected with the valve member and the casing in any suitable way; when the valve member is provided with a flange 24 as heretofore described, one end of said flexible wall is preferably attached to said flange, as by spinning the end corrugation over said flange as shown at 26 and suitably brazing or soldering the same thereto. The opposite end of said flexible wall is preferably provided with a radially projecting flange 27 which may be an integral extension of the end corrugation of said flexible wall, but which preferably takes the form of a rigid annulus suitably connected to the end corrugation, as by brazing or soldering, and having an outside diameter which is sufficiently large so that said flange will rest on the upper edge 28 of the cylindrical upper portion 29 of the valve casing 10.

Figure 3:
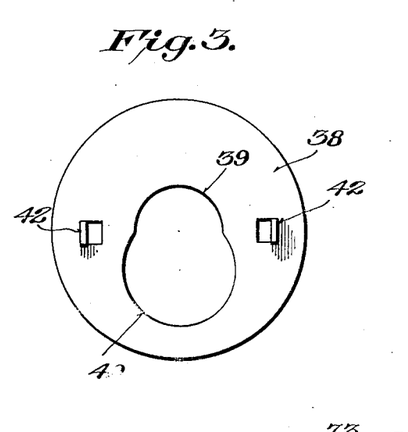
Fig. 3 is a plan of the retaining disc or member;—

The cylindrical portion 29 of the valve casing 10 is shown as provided with exterior threads 30 for cooperation with the interior threads 31 on a casing cap 32 adapted to close the top of said cylindrical extension 29. Said cap, at its under or interior face, is provided with a circular recess 33, and rotatably mounted within said recess is a flange 34 suitably mounted on, and preferably formed integrally with, a valve stem 35 which, at its lower or inner end, takes the form of an interiorly threaded sleeve 36 the threads of which correspond and mate with the exterior threads on the stem 23. Intermediate said flange 33 and said sleeve 36 the stem 35 is reduced in external diameter as shown at 37, and mounted within the groove thereby provided is a retaining disc or member 38 which preferably has substantially the same outside diameter as the flange 27. Member 38 may be constructed in any suitable way so as to be mounted in the groove 37 and held against axial displacement therein, but as shown in Fig. 3, it is preferably provided with a central aperture 39 of substantially the same diameter as the external diameter of the reduced portion 37 of the stem, and with a larger eccentric aperture 40 breaking into the apertures 39, said aperture 40 having a diameter at least as large as the outside diameter of the sleeve portion 36, so that member 38 may be mounted in the groove 37 by inserting the sleeve 36 into the aperture 40 and moving the member 38 until it is opposite the groove 37, whereupon the disc 38 may be moved laterally to engage the region of reduced diameter 37 in the aperture 39, in which position the shoulder between the groove 37 and the sleeve 36 will prevent axial displacement of said member 38. Said member 38 is also preferably so related to the cap 32 that, while it is separable or disconnectible therefrom it is non-rotatable with respect thereto. While this relation of the parts may be effected in any suitable way, said cap is preferably provided at its under or inner face with one or more recesses 41, and the member 38 is provided with a corresponding number of upstanding lugs 42, which may be conveniently formed by bending the same up from the material of the disc, and which enter the recesses 41 to prevent rotational displacement between said member 38 and the cap 32. Member 38 is also preferably united in any suitable way, as by brazing or soldering, to the flange 27 so that with the member 38 engaged in the groove 37 and the lugs 42 engaged in the recesses 41, the flexible wall 25 is also held in non-displaceable relation to the cap 32. When the cap 32 is threaded onto the cylindrical extension of the valve housing 10, it clamps the flange 27 and member 38 between said cap and said housing, as clearly shown in Fig. 1, and thereby forms a fluid-tight joint between said flexible wall and said housing.

Figure 4:
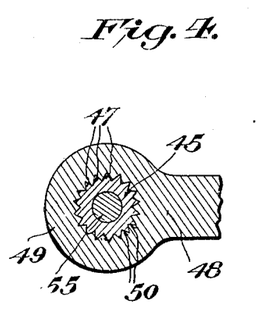
Fig. 4 is a detail section on the line 4—4 of Fig. 1.

Valve stem 35 has its upper or outer end 43 projecting through a central aperture 44 formed in the cap 32, and the outer end 45 of this projecting portion is made of reduced diameter as shown in Fig. 1 so as to leave a shoulder 46. This portion of reduced diameter is preferably provided with peripheral serrations 47 as shown in Fig. 4. Mounted on this projecting end 43—45 of the valve stem 35 is an operating member 48 of any suitable construction. In the form shown said operating member 48 has a cylindrical hub 49, the aperture 50 of which at its upper or outer end is shaped to conform with the size and shape of the portion 45 of the projecting end of the valve stem, being provided with peripheral serrations in the form shown to correspond with the serrations 47 on said portion 45. The lower or inner portion of said aperture in the hub 49 is enlarged in diameter as shown at 51 so as to provide a shoulder 52 which may rest on the shoulder 46 and prevent said hub 49 from moving down on the projecting end of the valve stem beyond a predetermined amount. The interior diameter of the portion 51 of said aperture is substantially larger than the exterior diameter of the portion 43 of the valve stem so as to form an annular recess 53 between the valve stem and the operating member. Mounted within this recess 53 is a coil spring 54 which at its upper end bears against the shoulder 52 and its lower end bears against the top surface of the cap 32.

Said operating member 48 may be retained on the projecting end 43—45 of the valve stem in any suitable way, as by a screw 55 entering a threaded aperture 56 in the projecting end of the valve stem, with an interposed washer 57 between the head of said screw and the end of said hub. Said operating member 48 may also be provided with a handle of any suitable form, being shown as provided with a sleeve 58 of any suitable heat-lagging material retained on the stem 59 of said member by a screw 60.

Figure 2:
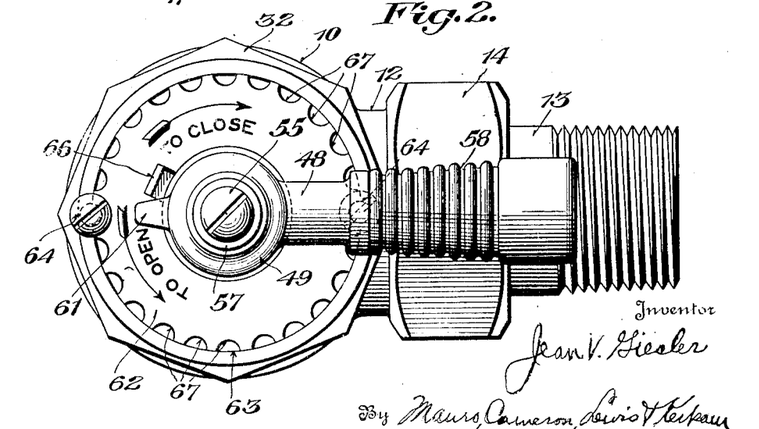
Fig. 2 is a top plan view of said valve;—

Means are also preferably provided for indicating the position of the valve member and, to this end, a pointer 61 is provided on the operating member for cooperation with any suitable scale or indicia on the top of the cap 32. I preferably employ a separate dial plate 62 and to this end, the top surface of the cap 32 is shown as provided with an annular recess 63 to receive said dial plate. Said dial plate is preferably adjustable on said cap 32 and may be held in adjusted position in any suitable way as by one or more screws 64 which enter threaded apertures 65 in said cap adjacent the periphery of the dial plate and the heads of which overhang and clamp the dial plate 62 fixedly in position. I also preferably provide said dial plate with an upstanding lug 66 in the path of the pointer 61 to act as a stop to prevent the opening of said valve beyond a predetermined amount and, to prevent the displacement of said dial plate by the engagement of said pointer 61 with said lug 66, I preferably provide means for positively locking said dial plate in its adjusted position. While any suitable means may be employed to this end I preferably provide the periphery of said dial plate 62 with serrations 67 which cooperate with the shanks of the screws 64 to lock said dial plate against rotational movement except when the screws are removed.

Figure 5:
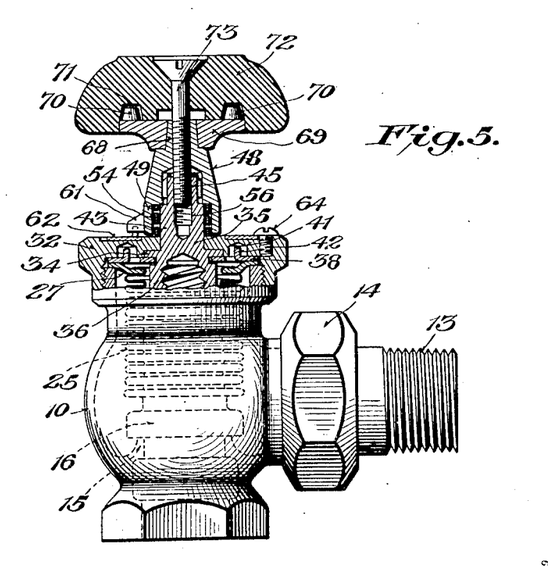
Fig. 5 is an elevation, partly in axial section, of another embodiment of the present invention.

In place of a lever handle on the operating member as shown in Figs. 1 to 4, said operating member may have a round handle as shown in Fig. 5. In the structure here shown, the operating member 48, in place of a laterally extending stem for carrying the heat-lagging sleeve 58, is provided with an axially extending upper portion 68, square or otherwise suitably formed, on which is non-rotatably mounted a handle follower 69 provided with upstanding lugs 70 which engage in corresponding recesses 71 in a handle 72 of any suitable shape and material. The handle 72 and follower 69 are retained on the operating member 48 by a screw 73 which passes through a central aperture in said handle and the operating member and is threaded into the threaded opening 56 in the end of the valve stem heretofore described. Otherwise the structure of Fig. 5 is the same as that of Figs. 1 to 4.

In place of the coil spring 54 heretofore described, the member 38 may be suitably shaped and formed of resilient material so as to operate as a spring and retain the flange 34 on the valve stem 35 in the recess 33 in the cap 32, or, if desired, the spring disc 38 may be used in conjunction with the coil spring 54 to supplement its action.

In assembling the parts the member 38 is passed over the sleeve 36 until it is in alignment with the groove 37, and is then displaced laterally until its central aperture 39 is engaged in said groove. In this position said member 38 is prevented from displacement axially of the valve stem 35. Said member 38 may then be secured to the flange 27 on the flexible wall 25 after the sleeve 36 has been threaded onto the stem 23, and the flexible wall, valve member and valve stem are thereby connected into a unit. The valve stem 35 may then be passed through the aperture 44 in the cap 32 and the lugs 42 engaged in the recesses 41. The coil spring 54 is then positioned on the projecting end 43 of said valve stem and the hub 49 of the operating member 48 passed over the projecting end of said valve stem with its serrations 50 in engagement with the serrations 47 on the latter. The parts are then secured together by threading the screw 55 into the aperture 56.

The coil spring 54, supplemented by the resiliency of the disc 38 when the latter is made in the form of a spring, therefore reacts between the operating member 48 and the cap 32 to hold the flange 34 in the recess 33 and the lugs 42 in the recesses 41. Inasmuch as the disc 38 may not rotate with respect to the cap owing to the engagement of the lugs 42 in the recesses 41 and may not move axially with respect to said cap owing to its engagement in the groove 37, and inasmuch as the flexible wall is connected to said disc 38 and to the valve member 16 while the stem 23 of said valve member is in threaded engagement with the sleeve 36 on the valve stem 35, and inasmuch as the valve stem is held against displacement with respect to the cap by the engagement of the flange 34 in the recess 33 and the action of the spring 54 between the cap and the operating member 48 which is secured on the outwardly projecting end of said valve stem,— the cap, flexible wall, valve member and operating means are all connected into a unit which may be readily attached to and detached from the valve casing by rotating the cap so as to engage its thread with or disengage its thread from the thread on the cylindrical extension 29 of the valve casing. Moreover, as the indicating means is also unitarily related with said operating member and said cap, the attachment and detachment of said unit does not disturb the relation of said indicating means. Therefore whenever the valve disc needs renewal the unit heretofore described may be readily removed from the valve casing without disturbing the relation of the flexible wall to the valve member, cap or operating means and without disturbing the relation of the indicating means to the valve member and, after renewal of the valve disc, may be as readily applied to said valve casing without disturbing the relation of the parts of said unit. At the same time, these parts may be readily disconnected when desired by removing the screw 55 and taking off the operating member 48, when the cap 32 may be removed from the retaining member 38 and, if desired, the valve stem 35 may be disconnected from said member. Hence in case of the necessity of renewing the flexible wall, the parts of the unit may be readily disconnected and a new flexible wall supplied without supplying a new casing cap or new operating means.

The opening of the valve member may also be readily adjusted by removing the operating member 48 and replacing it in a new angular relation with respect to the valve stem 35, the serrations 47 and 50 permitting nice adjustment between the valve stem and operating member. The dial plate 62 may also be readily adjusted to adjust the amount of valve opening or to correctly indicate the position of the valve member by removing the screws 64 and rotating the dial plate 62 in the recess 63, whereupon the dial plate may be positively locked in adjusted position by the engagement of the screws 64 in its serrations 67.

In operation, the valve is opened or closed by rotating the operating member 48, said member 48 rotating the valve stem 35 owing to the interlock effected by the serrations 47 and 50. Valve stem 35 rotates in the cap 32, the flange 34 rotating in the recess 33, and the rotational movement of the stem 35 is transformed into a rectilinear movement of the stem 23 owing to the coaction of the threads on the sleeve 36 and said stem 23. Therefore by the co-action of the parts of this two-part valve stem, the valve member 16 receives a rectilinear motion toward or away from its seat. The opening movement of said valve member is preferably controlled by the engagement of the pointer 61 with the lug 66, but in closing the valve, the valve member preferably engages its seat before the pointer 61 engages the lug 66, so that said lug does not interfere with the proper closing of the valve.

To prevent an undesirable sound owing to the metal to metal contact of the flange 34 in the recess 33 a lubricating washer may be interposed between these metallic surfaces. The friction between said flange 34 and the cap 32 is sufficient to prevent any accidental opening of the valve under the pressure of the heating fluid or the resiliency of the flexible wall. Moreover, as said flange 34 is firmly held in its recess 33 by the coil spring 54, or by the disc 38 when the latter is made in the form of a spring or by their conjoint action when both are used, the valve stem can have no loose play with respect to the casing cap and the entire rotational movement of said stem is transformed into rectilinear movement of the valve member.

It will therefore be perceived that a packless valve has been provided in which the valve member, flexible wall, casing cap and valve operating and indicating means constitute a readily attachable and detachable unit which may be removed to renew the valve disc without disturbing the relation of the flexible wall to the valve member, casing cap or operating means and without disturbing the relation of the indicating means with respect to the valve member. Moreover, the valve member, flexible wall, casing cap and associated parts constitute a unit the parts of which may be readily disconnected when required. At the same time a unit composed of a valve member, casing cap, and valve operating means has been provided which may be used in conjunction with a flexible wall to constitute a packless valve without danger of rupturing the flexible wall when applying or removing the said unit, and which may employ a valve stem having a flange held in contact with the casing cap by a spring re-acting between the valve stem and cap to prevent loose play of said valve stem.

It will also be perceived that a valve member has been provided in the form of an easily manufactured element which includes an integral threaded stem for operating the same, an integral threaded stem for retaining the valve disc in position and an integral flange for the attachment of the flexible wall; also a readily adjustable dial plate has been provided which at the same time may be positively locked against rotational movement; also a connection between the operating member and valve stem has been provided which may be readily assembled and disassembled and which also provides for nice adjustment between the two; furthermore improved means have been provided for retaining the valve stem against loose play and axial displacement and also for uniting the flexible wall and casing cap into a disconnectible unit the parts of which are held against relative rotation. Furthermore a packless valve has been provided which is composed of a relatively few readily manufactured parts which are easy to assemble, install and adjust.

While the embodiments of the invention illustrated on the drawings have been described with considerable particularity, it is to be expressly understood that the invention is not restricted thereto, as the same is capable of receiving a variety of mechanical expressions some of which will now readily suggest themselves to those skilled in the art, while changes may be made in the details of construction, arrangement and proportion of parts, and certain features used without others, without departing from the spirit of this invention. Thus it may be desirable in some instances to omit the provision for preventing the rotation between the casing cap and the flexible wall, in which event the spring 54 or the spring 38 or both will retain the valve stem against axial displacement and loose play. The disc 38 may also be left unconnected to the flange 37 when the provision against relative rotation is not desired. Again, if nice adjustment between the operating member 48 and the valve stem 35 is not desired the end of the valve stem may be squared and the aperture in said operating member given a corresponding form, or any other suitable means employed to prevent relative rotation. Changes may also be made in the details of securing the flexible wall in position and in the operating connection between the valve stem and the valve member, as well as in the structure of the valve member, casing cap, operating member, and indicating means, and in the relation of the valve stem and spring with respect to said cap, without departing from the spirit of the broader aspects of this invention.

Reference is therefore to be had to the claims hereto appended for a definition of the limits of the invention.

What is claimed is:—

1. A packless valve including in combination a valve casing provided with a valve seat, a valve member adapted to engage said seat, a flexible wall forming a fluid-tight connection intermediate said valve member and casing, a cap for said casing, means for operating said valve member, and a disconnectible but relatively non-rotational connection between said cap and said valve member and flexible wall, said connection detachably mounting said operating means on said cap, whereby said cap, valve member, flexible wall and operating means may be applied to and removed from said casing as a unit without disturbing the relation of said parts.

2. A packless valve including in combination a valve casing provided with a valve seat, a valve member adapted to engage said seat, a flexible wall forming a fluid-tight connection intermediate said valve member and casing, a cap for said casing, means including a two-part stem one of which parts is rotatable and the other rectilinearly movable for operating said valve member, and means separably connecting said cap, and said valve member, flexible wall and operating means into a unit which may be applied to and removed from said casing without disturbing the relation of the parts of said unit.

3. A packless valve including in combination a valve casing provided with a valve seat, a valve member adapted to engage said seat, a flexible wall forming a fluid-tight connection intermediate said valve member and casing, a cap for said casing, a stem rotatably mounted in said cap and having a threaded connection with said valve member for moving the same rectilinearly, means outside of said cap for rotating said stem, and a member connecting said cap, valve member, flexible wall and stem into a readily attachable and detachable unit.

4. A packless valve including in combination a valve casing provided with a valve seat, a valve member adapted to engage said seat, a flexible wall forming a fluid-tight connection intermediate said valve member and casing, a cap for said casing, a flanged stem rotatably mounted in said cap and having an operating connection with said valve member, a resilient member for maintaining said flange against said cap, and means for rotating said stem, said cap, valve member, flexible wall and associated parts constituting a readily attachable and detachable unit.

5. A packless valve including in combination a valve casing provided with a valve seat, a valve member adapted to engage said seat, a flexible wall forming a fluid-tight connection intermediate said valve member and casing, a cap for said casing, means for operating said valve member including a stem rotatably mounted in said cap and having an operating connection with said valve member, and cooperating means on said stem and cap for indicating the position of said valve member, said cap, valve member, flexible wall and operating means constituting a unit which may be applied to and withdrawn from said casing without disturbing the relation of said indicating means.

6. A packless valve including in combination a valve casing provided with a valve seat, a valve member adapted to engage said seat, a flexible wall forming a fluid-tight connection intermediate said valve member and casing, a cap for said casing, a stem rotatably mounted in said cap and having an operating connection with said valve member, and means outside of said cap for rotating said stem and provided with means for indicating the position of said valve member, said cap, valve member, flexible wall and associated parts constituting a unit which may be applied to and withdrawn from said casing without disturbing the relation of said indicating means.

7. A packless valve including in combination a valve casing provided with a valve seat, a valve member adapted to engage said seat, a flexible wall forming a fluid-tight connection intermediate said valve member and casing, a cap for said casing, a flanged stem rotatably mounted in said cap and having an operating connection with said valve member, a resilient member for holding said flange against said cap, means for rotating said stem, and means on said stem and cap for indicating the position of said valve member, said cap, valve member, flexible wall and associated parts constituting a unit which may be applied and withdrawn from said casing without disturbing the relation of said indicating means.

8. A packless valve including in combination a valve casing provided with a valve seat, a valve member adapted to engage said seat, a flexible wall forming a fluid-tight connection intermediate said valve member and casing, a cap for said casing, means for operating said valve member, and means for indicating the position of said valve member, said cap, valve member, flexible wall and operating and indicating means constituting a unit adapted to be applied to and withdrawn from said casing without disturbing the relation of said indicating means.

9. A packless valve including in combination a valve casing provided with a valve seat, a valve member adapted to engage said seat, a flexible wall forming a fluid-tight connection intermediate said valve member and casing, a cap for said casing provided with a dial plate serrated at its edge, means for retaining said dial plate on said cap and engaging the serrations to prevent rotation of said dial plate, and means for operating said valve member and cooperating with said dial plate to indicate the position of said valve member.

10. A packless valve including in combination a valve casing provided with a valve seat, a valve member adapted to engage said seat, a flexible wall forming a fluid-tight connection intermediate said valve member and casing, a cap for said casing constituting with said valve member and flexible wall a readily attachable and detachable unit, means for operating said valve member including a stem rotatable in said cap and having an operating connection with said valve member, a serrated dial plate carried by said cap, means for retaining said dial plate on said cap and engaging said serrations to prevent rotation of said dial plate, and means on said stem cooperating with said dial plate to indicate the position of said valve member.

11. A packless valve including in combination a valve casing provided with a valve seat, a valve member for engaging said seat provided with an integral flange and an integral threaded stem, a flexible wall secured to said flange and providing a fluid-tight partition in said casing between said valve member and said casing, a cap for said casing, and a stem rotatably mounted in said cap and having a threaded connection with the threaded stem on said valve member for moving said valve member rectilinearly upon the rotation of said stem.

12. A packless valve including in combination a valve casing provided with a valve seat, a valve member for engaging said seat provided with an integral flange and an integral threaded stem, a flexible wall secured to said flange and providing a fluid-tight partition in said casing between said valve member and said casing, a cap for said casing constituting with said valve member and said flexible wall a readily attachable and detachable unit, and a stem rotatably mounted in said cap and having a threaded connection with the stem on said valve member for moving said valve member rectilinearly upon the rotation of said stem.

13. A packless valve including in combination a valve casing provided with a valve seat, a valve member provided with an integral flange and integral threaded stems projecting from each side thereof, a valve disc retained on one of said threaded stems, a cap for said casing, valve operating means having a connection with the other of said threaded stems and rotatably mounted in said cap, and a flexible wall secured to said flange at one end and clamped between said cap and said casing at its opposite end.

14. A packless valve including in combination a valve casing provided with a valve seat, a valve member adapted to engage said seat, a flexible wall secured to said valve member at one end and provided with a flange at its opposite end, a cap for said casing adapted to clamp said flange between said cap and said casing, operating means for said valve member, and means detachably but non-rotatably connecting said flexible wall to said cap and cooperating with said operating means to detachably retain said wall on said cap against axial displacement and thereby provide a readily attachable and detachable unit.

15. A packless valve including in combination a valve casing provided with a valve seat, a valve member adapted to engage said seat, a flexible wall secured to said valve member at one end and provided with a flange at its opposite end, a cap for said casing adapted to clamp said flange between said cap and said casing, a member mounted on said cap and provided with means cooperating with said cap to prevent relative rotation between the two, said member being secured to said flange, and means carried by said cap for operating said valve member.

16. A packless valve including in combination a valve casing provided with a valve seat, a valve member adapted to engage said seat, a flexible wall forming a fluid-tight connection intermediate said valve member and said casing, a cap for said casing, a member non-rotatably mounted on said cap and connected to said flexible wall, and operating means mounted on said cap and operatively connected to said valve member, said operating means preventing detachment of said member from said cap.

17. A packless valve including in combination a valve casing provided with a valve seat, a valve member adapted to engage said seat, a flexible wall forming a fluid-tight connection intermediate said valve member and said casing, a cap for said casing, a stem rotatably mounted in said cap and having an operating connection with said valve member, a member held on said stem against axial displacement and secured to said flexible wall, said member cooperating with said cap to prevent relative rotation between the two, and means for rotating said stem.

18. A packless valve including in combination a valve casing provided with a valve seat, a valve member adapted to engage said seat, a flexible wall forming a fluid-tight connection intermediate said valve member and said casing, a cap for said casing, a stem rotatably mounted in said cap and having an operating connection with said valve member, a disc mounted in a groove in said stem to prevent axial displacement of said stem, one or more lugs on said disc engaging in apertures in said cap to prevent relative rotation of said disc and cap, said disc being held from displacement relatively to said cap and means on said cap for rotating said stem.

19. A packless valve including in combination a valve casing provided with a valve seat, a valve member adapted to engage said seat, a flexible wall forming a fluid-tight connection intermediate said valve member and said casing, a cap for said casing, a stem rotatably mounted in said cap and provided with a flange engaging the same interiorly thereof, interior means for retaining said flange in engagement with said cap, a member mounted on said stem exteriorly for rotating the same, and a spring between said cap and last named member for supplementing the action of said interior flange-retaining means for retaining said flange against said cap.

20. A packless valve including in combination a valve casing provided with a valve seat, a valve member adapted to engage said seat, a flexible wall forming a fluid-tight connection intermediate said valve member and said casing, a cap for said casing, a stem rotatably mounted in said cap and having an operating connection with said valve member, a flange on said stem engaging said cap interiorly thereof, interior means for holding said flange against said cap, an operating member detachably mounted on said stem exteriorly of said cap and provided with an interior recess, and a spring in said recess between said member and said cap for supplementing the action of said interior flange-retaining means for holding said flange against said cap.

21. A packless valve including in combination a valve casing provided with a valve seat, a valve member adapted to engage said seat, a flexible wall forming a fluid-tight connection intermediate said valve member and said casing, a cap for said casing, a flanged stem rotatably mounted in said cap and having a threaded connection with said valve member, a member retaining said flange within said cap, an operating member mounted on said stem exteriorly of said cap and non-rotatable with respect thereto, means for retaining said operating member on said stem against axial displacement, and a spring reacting between said cap and said operating member to supplement the action of said first-named flange-retaining means for holding said flange against said cap.

22. A packless valve including in combination a valve casing provided with a valve seat, a valve member adapted to engage said seat, a flexible wall forming a fluid-tight connection intermediate said valve member and said casing, a cap for said casing, a flanged stem rotatably mounted in said cap and having an operating connection with said valve member, a member mounted on said stem against axial displacement and connected to said flexible wall, an operating member on said stem exteriorly of said cap, and a spring between said operating member and said cap to retain said flange against said cap and said flexible wall in unitary relation with said cap.

23. A packless valve including in combination a valve casing provided with a valve seat, a valve member adapted to engage said seat, a flexible wall forming a fluid-tight connection intermediate said valve member and said casing, a cap for said casing, a flanged stem rotatably mounted in said cap and having an operating connection with said valve member, a member mounted on said stem against axial displacement and provided with means cooperating with said cap to prevent relative rotation, said member being secured to said flexible wall, an operating member mounted on said stem exteriorly of said cap, and a spring reacting between said operating member and said cap to retain said flange against said cap and said flexible wall in unitary relation with said cap.

24. A packless valve including in combination a valve casing provided with a valve seat, a valve member adapted to engage said seat, a flexible wall forming a fluid-tight connection intermediate said valve member and said casing, a cap for said casing, a stem rotatably mounted in said cap and having an operating connection with said valve member, said stem having a flange engaging said cap interiorly, means for retaining said flange and flexible wall on said cap, and operating means mounted on said stem exteriorly of said cap.

25. A packless valve including in combination a valve casing provided with a valve seat, a valve member adapted to engage said seat, a flexible wall forming a fluid-tight connection intermediate said valve member and said casing, a cap for said casing, a stem rotatably mounted in said cap and having an operating connection with said valve member, said stem having a flange engaging said cap interiorly, a resilient disc cooperating with said flange and flexible wall to retain the same on said cap, and operating means mounted on said stem exteriorly of said cap.

26. A packless valve including in combination a valve casing provided with a valve seat, a valve member adapted to engage said seat, a flexible wall forming a fluid-tight joint with said valve member and provided with a flange, a cap for said casing for clamping said flange between said cap and said casing, a valve stem rotatably mounted in said cap and having an operating connection with said valve member, and a disc held against axial displacement on said stem, said disc also being clamped between said cap and said casing and co-operating with said flexible wall to retain the same on said cap.

27. A packless valve including in combination a valve casing provided with a valve seat, a valve member adapted to engage said seat, a flexible wall forming a fluid-tight joint with said valve member and provided with a flange, a cap for said casing for clamping said flange between said cap and said casing, a valve stem rotatably mounted in said cap and having a threaded connection with said valve member whereby rotation of said stem produces rectilinear movement of said valve member, a disc on said stem cooperating with said stem and flexible wall and with said cap interiorly of the same to retain said flexible wall on said cap, and means for rotating said stem mounted on said stem exteriorly of said cap.

28. A packless valve including in combination a valve casing provided with a valve seat, a valve member adapted to engage said seat, a flexible wall forming a fluid tight joint with said valve member and said casing, a cap for said casing, a valve stem rotatably mounted in said cap and having an operating connection with said valve member, a disc on said stem cooperating with said cap and flexible wall to retain said wall in non-rotatable but detachable relation with said cap, and means for operating said stem.

29. A packless valve including in combination a valve casing provided with a valve seat, a valve member adapted to engage said seat, a flexible wall forming a fluid tight joint with said valve member and said casing, a cap for said casing, a valve stem rotatably mounted in said cap and having an operating connection with said valve member, a disc detachably mounted on said stem against axial displacement, said disc cooperating with said cap and flexible wall to retain said wall in non-rotatable but detachable relation with said cap, and means for operating said stem.

30. A packless valve including in combination a valve casing provided with a valve seat, a valve member adapted to engage said seat, a flexible wall forming a fluid tight joint with said valve member and said casing, a cap for said casing, a valve stem rotatably mounted in said cap and having an operating connection with said valve member, said stem having a portion of reduced diameter, a disc having an aperture fitting said portion of reduced diameter whereby said disc is held against axial displacement on said stem, said disc cooperating with said cap and flexible wall to retain said wall in non-rotatable but detachable relation with said cap, and means for operating said stem.

31. A packless valve including in combination a valve casing provided with a valve seat, a valve member adapted to engage said seat, a cap for said casing, means for operating said valve member including a member rotatably mounted in said cap, a flexible wall forming a fluid-tight connection intermediate said valve member and said casing, and means providing a relatively non-rotatable but detachable connection between said flexible wall and said cap, said means holding said valve-operating means against axial displacement with respect to said cap, whereby said cap, flexible wall, valve member and operating means constitute a readily attachable and detachable unit.

32. A packless valve including in combination a valve casing provided with a valve seat, a valve member adapted to engage said seat, a cap for said casing, a flexible wall forming a fluid-tight joint between said valve member and said casing, means for operating said valve member detachably mounted in said cap, and means for detachably connecting said flexible wall to said cap and normally held against rotatable displacement with respect thereto, said means holding said valve-operating means against axial displacement with respect to said cap.

33. A packless valve including in combination a valve casing provided with a valve seat, a valve member adapted to engage said seat, a flexible wall forming a fluid-tight joint with said valve member and said casing, a cap for said casing, rotatable means mounted in said cap and provided with an operating connection with said valve member, and means for retaining said operating means against axial displacement in said cap, said means including a member detachably connecting said flexible wall to said cap and, through the connection of said flexible wall and said valve member to said operating means, detachably connecting said cap, operating means, valve member and flexible wall into a unit which may be readily attached to and detached from said casing.

34. A packless valve including in combination a valve casing provided with a valve seat, a valve member adapted to engage said seat, a flexible wall forming a fluid-tight joint with said valve member and said casing, a cap for said casing, rotatable means mounted in said cap and provided with an operating connection with said valve member, cooperating elements on said operating means and said cap for indicating the position of said valve member, and means for retaining said operating means against axial displacement in said cap, said means including a member detachably connecting said flexible wall to said cap and, through the connection of said flexible wall and said valve member to said operating means, detachably connecting said cap, operating means, indicating means, valve member and flexible wall into a unit which may be readily attached to and detached from said casing.

35. A packless valve including in combination a valve casing provided with a valve seat, a valve member adapted to engage said seat, a flexible wall forming a fluid-tight joint with said valve member and said casing, a cap for said casing, rotatable means mounted in said cap and provided with an operating connection with said valve member, means for retaining said operating means against axial displacement in said cap and for preventing relative rotation between said cap and said valve member and flexible wall, said means, through the connection of said flexible wall and said valve member to said operating means, detachably connecting said cap, operating means, valve member and flexible wall into a unit which may be readily attached to and detached from said casing.

36. A packless valve including in combination a valve casing provided with a valve seat, a valve member adapted to engage said seat, a flexible wall forming a fluid-tight joint with said valve member and said casing, a cap for said casing, rotatable means mounted in said cap and provided with an operating connection with said valve member, cooperating elements on said operating means and said cap for indicating the position of said valve member, means for retaining said operating means against axial displacement in said cap and for preventing relative rotation between said cap and said valve member and flexible wall, said means, through the connection of said flexible wall and said valve member to said operating means, detachably connecting said cap, operating means, indicating means, valve member and flexible wall into a unit which may be readily attached to and detached from said casing.

In testimony whereof I have signed this specification.

JEAN V. GIESLER.